(12) United States Patent
Birger

(10) Patent No.: US 6,691,744 B1
(45) Date of Patent: Feb. 17, 2004

(54) ACTUATOR AND THREAD BRAKE COMPRISING AN ACTUATOR

(75) Inventor: Johansson Birger, Ulricehamn (SE)

(73) Assignee: Iropa AG, Baar (CH)

(*) Notice: Subject to any disclaimer, the term of this patent is extended or adjusted under 35 U.S.C. 154(b) by 0 days.

(21) Appl. No.: 10/030,008

(22) PCT Filed: Apr. 27, 2000

(86) PCT No.: PCT/EP00/03845
§ 371 (c)(1),
(2), (4) Date: Apr. 12, 2002

(87) PCT Pub. No.: WO00/64795
PCT Pub. Date: Nov. 2, 2000

(30) Foreign Application Priority Data

Apr. 27, 1999 (DE) .......................... 199 19 122

(51) Int. Cl.⁷ .......................... B65H 59/22; B65H 59/20
(52) U.S. Cl. .................. 139/450; 139/1 R; 242/149; 242/419.4; 242/419.5
(58) Field of Search ................ 335/271, 277, 335/269, 272, 274; 139/450; 242/149, 150 R, 151, 152, 156, 156.1, 156.2, 419.4, 419.5

(56) References Cited

U.S. PATENT DOCUMENTS

| | | | |
|---|---|---|---|
| 3,750,065 A | | 7/1973 | Myers |
| 4,660,783 A | * | 4/1987 | Roser et al. ............ 242/155 R |
| 4,875,506 A | * | 10/1989 | Gacsay et al. ............ 139/450 |
| 5,028,900 A | * | 7/1991 | DeWitt ........................ 335/228 |
| 5,244,164 A | * | 9/1993 | Gacsay ........................ 242/149 |
| 5,343,983 A | * | 9/1994 | Horvath et al. ............ 188/65.1 |
| 5,492,286 A | | 2/1996 | Motta |
| 5,560,557 A | * | 10/1996 | Horvath et al. ............ 242/149 |
| 5,778,943 A | * | 7/1998 | Tholander .................... 139/452 |
| 6,037,852 A | * | 3/2000 | Pfab ............................ 335/274 |
| 6,095,449 A | * | 8/2000 | Gallo et al. ............... 242/365.4 |
| 6,164,580 A | * | 12/2000 | Tholander et al. ....... 242/365.4 |

FOREIGN PATENT DOCUMENTS

| | | |
|---|---|---|
| EP | 0 527 510 | 2/1993 |
| EP | 0 597 239 | 5/1994 |
| EP | 0 816 275 | 1/1998 |
| WO | WO 97/49630 | 12/1997 |

* cited by examiner

*Primary Examiner*—John J. Calvert
*Assistant Examiner*—Robert H. Muromoto, Jr.
(74) *Attorney, Agent, or Firm*—Flynn, Thiel, Boutell & Tanis, P.C.

(57) ABSTRACT

An actuator (A) for a component (2), comprising at least one defined stop position, in particular to a brake component actuator of a yarn brake (B), for a selective braking of a running yarn (Y) which actuator has a drive element (D) for linear or rotational adjustment of the component (2). Said actuator is provided with at least one stop device (C). The stop device (C) consists of an additional body (Z), supported in a displaceable manner on a motion damping device (F, G, H). The actuator (A) in the yarn brake is a reversible motor, suitably a magneto-electric motor (M) for rotational movement. An additional body (Z), supported in a displaceable manner on a motion damping device, is provided in each stop device, at which the yarn brake is to stop. During a linear adjustment of the component (2), the mass (m1) of the additional body (Z) matches the mass (m) of the displaced parts. In contrast, with a component (2) that can be rotatably adjusted, the moment of inertia(I1) of the additional body (Z) matches the moment of inertia (I) of the displaced parts, in relation to the axis of rotation.

18 Claims, 4 Drawing Sheets

(Stand der Technik)

ACTUATOR AND THREAD BRAKE COMPRISING AN ACTUATOR

FIELD OF THE INVENTION

The present invention relates to an actuator for a rotatable or linearly movable component with at least one defined stop position, and also to an actuator of a braking component of a yarn brake.

BACKGROUND OF THE INVENTION

An actuator for a yarn brake of a disk brake type known from EP-A-05 97 239 is structured as a permanent magnet motor carrying out a 360°-rotational movement of a component actuating the yarn within four extremely quick steps. The respective stop position after a step has been carried out is adjusted purely by magnet forces and such that a respective braking position or release position for the yarn is defined. The armature is electromagnetically arrested by the magnet field generated by the excited coil. Due to inertia, the armature tends to continue its rotation beyond an equilibrium position where it is parallel to the respective exciting magnet field. The angle opening between both magnet fields then causes a return torque for the armature. Said return torque defines a quasi-electromagnetic stop. The return torque generated to define the stop position leads to a disadvantageous backwards jerk of the component of the yarn brake which may influence the braking or releasing behaviour of the yarn brake in undesired fashion, i.e., any transition to the respective braking position or releasing position cannot be controlled properly.

Furthermore, controlled yarn brakes having an electric turning actuator are known in practice. Said yarn brakes include a resilient rubber stop defining a stop position. The component of the yarn brake hits the stop after the quick adjustment movement. The result is a jerking motion backwards which may lead to the undesirable effect that the component undesirably influences the yarn even in the braking position or the releasing position, respectively. A jerking movement in the backward direction also may occur at a stopper of a stopping device which is actuated by a linear magnet between a blocking position and a releasing position. Such stop devices are known in yarn feeding devices for jet weaving machines. In this case, the backward jumping motion may allow the weft yarn to slip through, or the withdrawn weft yarn is caught at the stopper.

It is an object of the invention to provide a quick and compact actuator of the kind as disclosed as well as a controlled yarn brake including such an actuator, wherein despite quick adjustment movements the moveable component achieves the respective stop position without jumping back.

Said object can be achieved by providing an additional body at the stop position, the additional body having substantially the mass or the moment of inertia of the drive element and the rotatable or linearly movable component, the additional body being displaceably supported at a returnable motion damping device.

The mass (in case of a linear movement) or the moment of inertia (in case of a rotational movement) of the additional body is precisely matched to the mass or the moment of inertia of the moveable parts. The additional body takes over the entire impact energy without inducing a backward motion. At the stop position, the moveable parts abruptly are brought to a stand still. The additional body continues to move such that its energy will be dissipated in the motion damping device before the additional body returns in delayed fashion into its home position. Said additional body reaches its home position without displacing the parts in the opposition direction which parts already were brought into a stand still condition without jumping back. This results in a yarn brake having the advantage that the moveable parts do not undergo any further swinging motion during the transition from one braking position to another or to a releasing position, and that the intended braking or releasing effect is not influenced detrimentally. Within the time period usually existing for the actuation of controlled yarn brakes, e.g. about 5 ms, the moveable parts are brought to a stand still at a precisely determined position and without jumping back. This is particularly expedient for actuators or yarn brakes, respectively, the working operation of which takes place with a rotation or a linear movement. The actuator may comprise a drive element which is actuated magnetically, electromagnetically, electrically, hydraulically, mechanically or pneumatically. The expedient function results from the inventive measure to first introduce the impact energy totally into the additional body to achieve an absolute stand still and a correct positioning of the moveable parts, and to dissipate the impact energy and to then return the additional body with a delay and damped into the home position such that even then no backwards jump will be generated.

Expediently, the motion damping device for the additional body includes resilient friction damping means and a damped return function with a precisely limited stroke. The additional body brings the moveable part in its home position abruptly to a stand still and then has a longer time to let its energy dissipate and to return into its home position. The time period available for this function corresponds at maximum to the time period between two subsequent working cycles of the actuator in the same direction of movement. Employing the additional body results in a time buffer for energy dissipation and offers the possibility of carrying out the energy dissipation in a precisely predetermined fashion and relatively slowly. During the impact a part of the kinetic energy is converted into heat energy while the remaining part of the kinetic energy is transmitted from the additional body into the motion damping device and is converted into heat energy there. The return function brings the additional body exactly back into the home position, preferably relatively slowly and without causing a jerking motion in a backward direction of the earlier stopped parts.

The additional body can be manufactured simply from a hard or non-resilient material, e.g. from a plastic material like polyurethane. The motion damping device with its return components can be made from a highly resilient material like soft elastic plastic material, e.g. in the form of a polyurethane-foam cushion, which supports the additional body or provides the energy dissipation and return function to return the additional body with a delay to avoid a backward jump of the moveable parts.

It is advantageous to provide two stop devices limiting the working stroke of the actuator or the component, respectively. In each stop device at least one additional body is used to stop the moveable parts. Each stop device, furthermore, can be separated into at least two symmetrical halves which are symmetrical with respect to the axis of the movement of the component such that for a single stop position two additional bodies and two motion damping devices are provided. The mass (for a linear movement of the actuator) or the moment of inertia (for a rotational movement of the actuator) of the additional body should correspond relatively precisely to the mass or the moment of inertia, respectively, of all parts to be moved into the stop position. When separating a stop device into at least two symmetrical halves, of course, the respective additional body only needs to have half of the mass or of the moment of inertia transmitted by the stop element.

An expedient embodiment employs an electric actuator including a linear electromotor or a rotating electromotor. Particularly advantageous is a permanent magnet motor constituting said linear motor or said rotational electromotor. It can be manufactured with few structural components, with high operation reliability and quick response behaviour.

It is advantageous to incorporate the stop device or each stop device structurally into the electromotor or the permanent motor, respectively. This allows the manufacturer to provide the necessary precise settings.

In case of a reversing permanent magnet motor or a rotating actuator expediently each stop device is located between the armature and a rotational bearing for an armature shaft and/or a shaft of the component, or between two rotational bearings of the armature shaft. In this area sufficient mounting space is available to receive the stop device.

In a permanent magnet motor the full cross-section of the armature preferably should be useable for the electromagnetic polarisation, in view of a quick response behaviour and a high power. At the same time, the armature shaft has to guarantee an accurate rotational support and long lift duration with optimum low rotational resistance. Both requirements are opposite to each other. In order to avoid a penetration of the armature by the armature shaft the component or a section of the armature shaft may comprise a hub part which either grips the front end of the armature like a pot or which is inserted like a plate into said front end. Since the armature shaft or component does not need to be an electromagnetically active part of the armature, it can be optimised in view of strength and functionality. To the contrary, the armature which is not penetrated by the armature shaft in this case can be designed for optimum magnetic function and can be polarised over its full cross-section.

Expediently the armature is supported for rotation at both ends by means of coaxial spindles. However, said spindles do not penetrate the armature. This facilitates manufacturing of the permanent magnet motor and improves its operation performance.

In case that the armature of an electromotor constitutes the drive element for the component of a yarn brake, quick linear or rotating adjustment movements can be generated.

In a yarn brake the driving element expediently is constituted by the magnetically polarised armature of a permanent magnet motor.

The stop device which is responsible for the positioning of the moveable parts of the yarn brake without backwards jumps expediently is incorporated into the actuator.

BRIEF DESCRIPTION OF THE DRAWINGS

Embodiments of the invention will be explained with reference to the drawings, in which.

DETAILED DESCRIPTION

Figure 1:
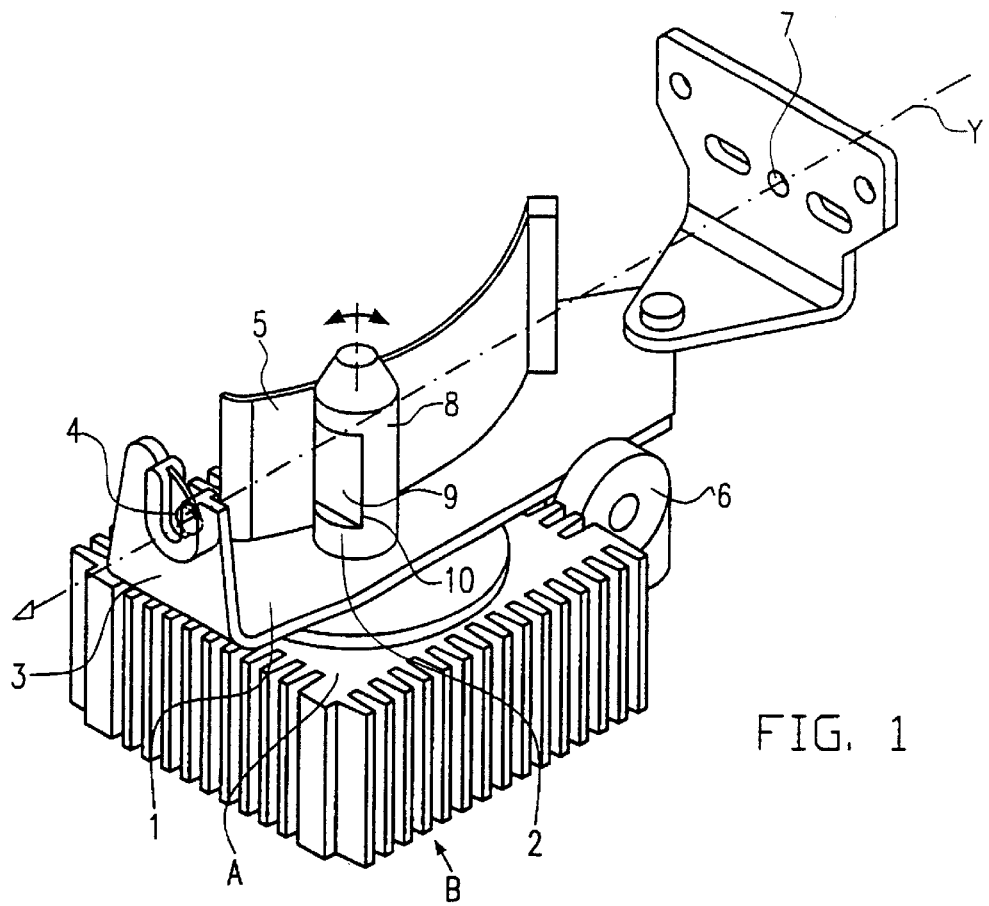
FIG. 1 is a perspective view of a yarn brake including an actuator.

FIG. 1 shows a yarn brake B for variably braking a running yarn Y. A block-shaped actuator A, e.g. a permanent magnet motor, is fixed at a holder 1. Actuator A serves to drive a component 2 for rotation about a rotational axis. The running path of a yarn Y through the yarn brake B is determined by yarn guiding elements 4, 7. Yarn guiding element 4 is provided in an end wall 3. Furthermore, as an active braking element a spring lamella 5 is secured to holder 1 such that it is pressed resiliently against a cylindrical braking part 8 integrated into component 2. The contact pressure can be adjusted at 6. A recessed window 9 is formed in at least one circumferential portion of component 2. The window 9 is defined by transitions 10 which extend into the cylindrical braking part 8. The yarn Y is pulled through between the spring lamella 5 and component 2. Depending on the rotational position of component 2 the yarn either is clamped and braked between 8 and 5 or is pulled without clamping through window 9. Any switchover of yarn brake B is made by rotating component 2 by means of actuator A, for example about 90°, into an exactly defined position such that either the cylindrical braking part 8 will contact the spring lamella 5 or such that a free space is created between spring lamella 5 and window 9.

Figure 2:
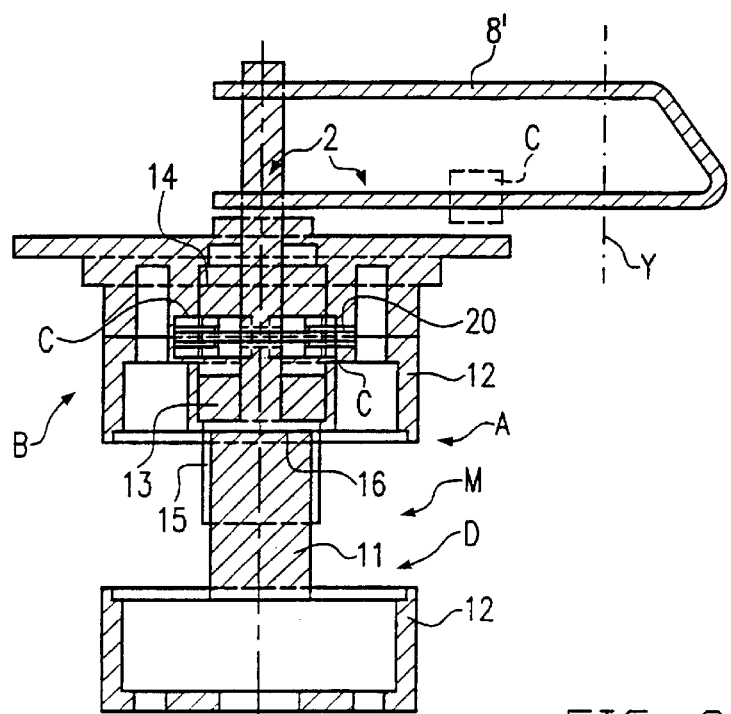
FIG. 2 is an axial section of a further embodiment of a yarn brake including a rotational actuator designed as a permanent magnet motor.

The yarn brake B shown in FIG. 2 is a so-called deflection brake. A braking part is formed as a U-shaped bracket 8' fixed to component 2 which can be rotated about its centre axis. The yarn Y indicated by dashes and dots, may interfere with the bracket 8'. Depending on the rotational position of component 2, yarn Y is deflected stronger or weaker (stronger or weaker braking effect) or the yarn is not deflected at all (no braking effect or release position). At least two stop devices C incorporated into actuator A define two different rotational positions of component 2 between which component 2 is rapidly rotated back and forth by actuator A, e.g. within a few milliseconds.

The component 2 (a kind of a spindle) is connected to a rotating drive element D constituted by a magnetically polarised armature 11 of a permanent magnet motor M (which will be explained with the help of FIGS. 3 to 5). Housing parts 12 comprise rotational bearings 13, 14 for armature 11 and component 2, respectively. Component 2 contains a pin-like stop element 29 which is aligned in a rotational direction with the stop devices C defining the respective stop position. For each sense of rotation a pair of stop devices C may be provided. Permanent magnet motor M is reversible. Stop devices C are integrated into housing parts 12 at locations between the rotational bearings 13, 14. Alternatively, it is possible to locate stop devices C close to the lower end of armature 11 within or outside of housing parts 12, or—as shown in dotted lines—within the motion path of bracket 8' fixed to component 2.

Component 2 does not penetrate armature 11 but has a top shaped hub part 15 which is put onto armature 11 and grips over the armature front end.

Figure 3:
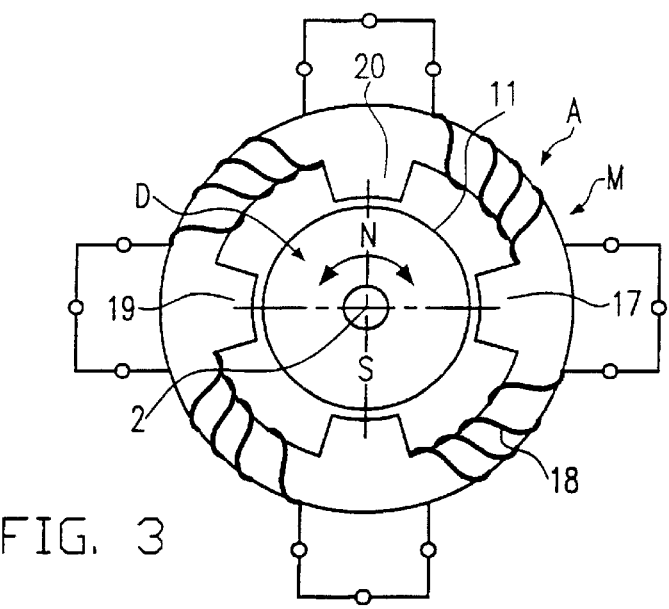
FIG. 3 schematically shows the internal structure of the permanent magnet motor of FIG. 2, in cross-section.

Armature 11 of permanent magnet motor M in FIG. 3 (which may serve as the actuator A of the yarn brakes shown in FIGS. 1 and 2) is a permanent magnet magnetically polarised lateral to the axis of rotation such that it has a magnetic north pole N and a magnetic south pole S. Armature 11 is supported for rotation by means of component 2 and at housing parts 12. Armature 11 is surrounded by an annular core 17 of an exciting coil 18. Exciting coil 18 may consist of several partial windings corresponding to the step number of the permanent magnet motor, and in the illustrated embodiment includes at least two partial windings. Corresponding with the step positions of armature 11, coil core 17 has pole pairs 19, 20 opposite exciting coil 18. In accordance with the polarisation of the exciting coil 18, the armature 11 will orient itself between said pole pairs. Diametrically opposed partial windings will be polarised in the same sense to build up a magnetisation which is parallel to the magnet filed of the armature. In case that the armature is to be rotated by 90°, the second pole pair oriented laterally with respect to the first pole pair will be magnetised accordingly. Current will flow in the same direction in the partial windings located between said poles such that a magnet field is generated between the associated magnet poles. The armature then will orient in the new rotational position corresponding to the turned or offset magnet field. In this fashion the armature can be rotated back and forth.

Figure 4:
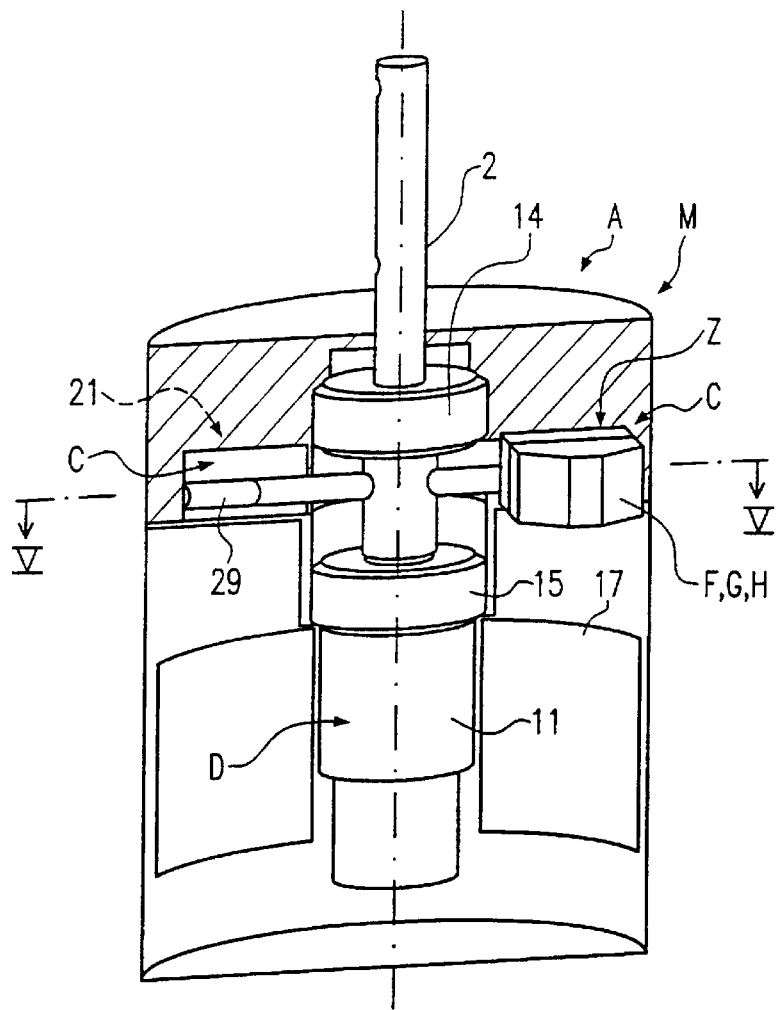
FIG. 4 is a perspective partial section in section plane IV—IV of FIG. 5 of a permanent magnet motor including a structurally integrated stop device.
Figure 5:
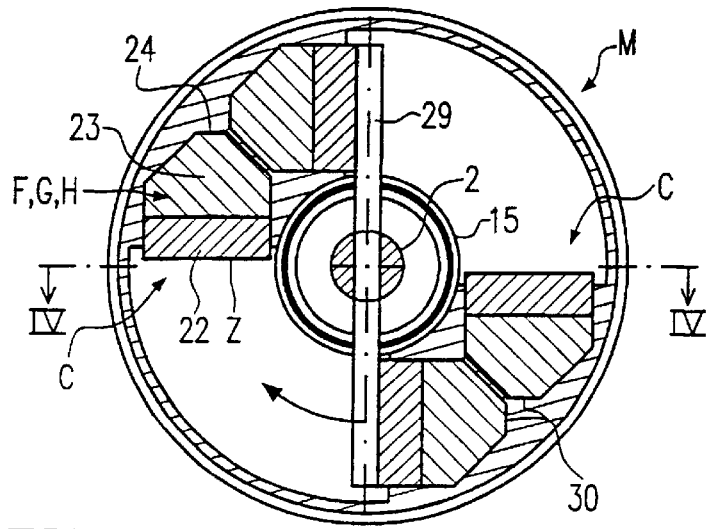
FIG. 5 is a cross-section in section plane V—V of FIG. 4.

According to FIGS. 4 and 5 the armature 11 is not stopped at its respective stop position purely by magnetic forces but the respective stop position is defined by mechanical coaction between stop element 29 and a respective stop device C. Stop devices C are structurally integrated into the permanent magnet motor M of FIG. 4 such that they are located between hub part 15 and rotational bearing 14.

Stop device C (FIGS. 4, 8) comprises an additional body Z and a motion damping device F, G, H having a return function. Stop device C is supported by a stationary stop 21. Additional body Z consists of relatively hard and non-resilient material, expediently of a dense polyurethane or of metal, e.g. with the shape of a block or cushion 22. Additional body Z has a moment of inertia I1 which corresponds to the moment of inertia I of the parts of the actuator A or the actuator A and the yarn brake B, respectively, which rotate. Additional body Z can be displaced in relation to stationary stop 21 or the motion damping device F, G, H, respectively. Motion damping device F, G, H comprises a body 23 with the shape of a block or a cushion made from highly resilient material, e.g. a polyurethane plastic material like a foam, to which additional body Z can be bonded. Body 23 has a surface 24 which can be supported at stationary stop 21. Body 23 is able to dissipate energy by deformation and to return its deformation elastically.

In case of a rotating actuator, as already mentioned, the moment of inertia I1 of the additional body Z is matched with the moment of inertia I of the rotating parts. Alternatively, an actuator could be provided which carries out linear movements between both stop positions. In this case additional body Z is matched in its mass m1 with the mass m of the moving parts.

The function of stop device C will be explained with the help of FIGS. 9, 10 and 11 for a linear actuator, and particularly in comparison to a conventional stop device C of a linear actuator, as symbolically shown in FIG. 12.

FIGS. 1 to 8 illustrate actuators A for components 2 which are adjusted by rotation. When discussing FIGS. 9 to 12 the function of a linear actuator A is explained. Said explanations are true in analogous fashion also for rotating actuators A, e.g. as shown in FIGS. 1 to 8, provided that instead of the mass the moment of inertia is considered. A linear actuator A could be constituted by the so-called stopper magnet (not shown) of a stop device of a weft yarn feeding device for a jet weaving machine.

Figure 12:
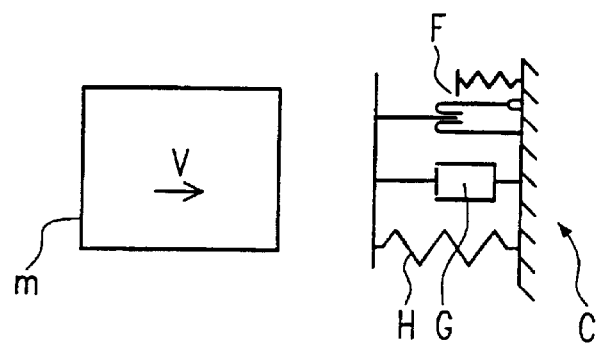
FIG. 12 illustrates in the form of a diagram an operational condition of a conventional actuator or a yarn brake.

As shown in FIG. 12 in the conventional stop device C, mass m of the moving parts driven by drive element D is just approaching stop device C with a speed V. The conventional stop device C comprises a motion damping device F, G, H, consisting of a friction damping means F, additively or alternatively a displacement damping means G, and a return component H. As soon as mass m impacts with speed V on stop device C in FIG. 12 kinetic energy is dissipated by friction or displacement and friction, respectively, within motion damping device F, G, H. This is carried out within a movement stroke of mass m with gradually decreasing speed. In this case, it cannot be avoided that mass m undergoes a jerking motion in a backward direction. As soon as the energy is dissipated, i.e., friction is converted into heat energy, mass m is returned by the return function H into the home position. This occurs with a backward motion of mass m beyond the home position.

To the contrary and according to the invention (FIGS. 9 to 11), stop device C provided with additional body Z has the task to define the correct stop position for mass m of the moving parts and, furthermore, to receive the entire impact energy and to transmit same into the motion damping device F, G, H. By taking over the entire impact energy from mass m, mass m stops without any jumping motion in the backward direction precisely at the initial position or stop position. For this purpose mass Ml of additional body Z is the same as mass m. In case of a rotating actuator A this is true for the moment of inertia of the moving part and the moment of inertia of the additional body, in relation to the axis of rotation.

Figure 9:
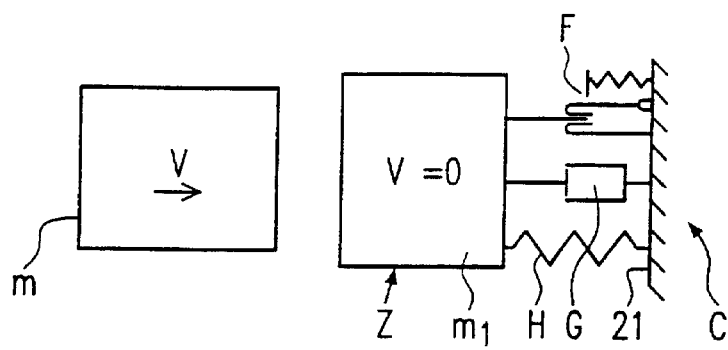
FIGS. 9–11 diagrammatically illustrate three operational conditions of the actuator or the yarn brake.

In FIG. 9 the moving parts are traveling by their mass m with speed V of driving element D, while additional body Z is at a stand still (speed V is zero). Motion damping device F, G, H still is passive and is supported at stationary stop 21.

Figure 10:
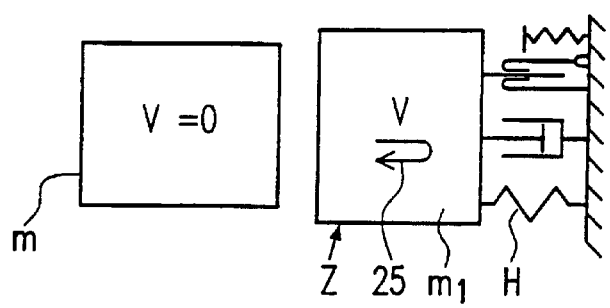

The impact happens between the phases of FIGS. 9 and 10. Mass m gives the entire kinetic impact energy to additional body Z or to the mass ml of additional body Z, and thus stops without motion in a backward direction (FIG. 10, speed V equals zero). Additional body Z then moves further on with its mass ml in the same direction such that its energy is dissipated by motion damping device F, G, H. Thereafter, the return function becomes active such that additional body Z will change its direction of movement with a delay (arrow 25) and will return in the direction towards its home position (FIG. 9). Said return motion is delayed and at the same time damped by motion damping device F, G, H.

Figure 11:
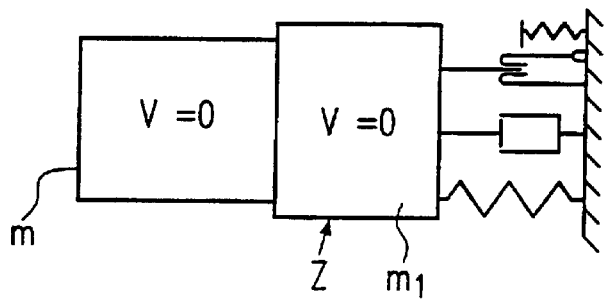

According to FIG. 11 additional body Z is returned precisely and damped into its home position. Its speed V at home position equals zero. The mass m of the already stopped parts remains stationary with speed V zero.

At least one stop device C may be provided for each of both stop positions of the armature 11 in FIGS. 4 and 5 or the yarn brakes B in FIGS. 1 and 2, respectively. Expediently, the stop devices C are structurally integrated into the actuator A. Alternatively, it is possible to situate stop devices C externally of actuator A. Furthermore, it may be desirable to separate each stop device into two halves which are situated symmetrically with respect to the axis of the moving components. In this case each additional body Z of one of said halves only has to have half of the mass m or half of the moment of inertia I of the moving parts.

Figure 6:
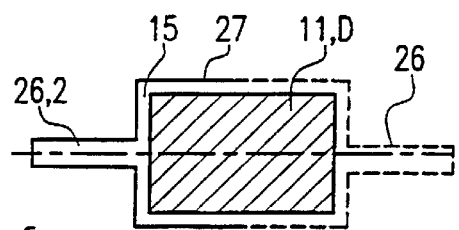
FIGS. 6 & 7 are detail axial sections of two variants.

According to FIG. 6 armature 11 is connected to the hub part 15 of component 2 or to hub parts 15 of two spindle shaped shafts 26 such that neither component 2 nor the armature shafts 26 penetrate armature 11. It is a purpose of hub parts 15 to properly support the armature for rotation without penetrating it. Both hub parts 15 may grip over the entire length of cylindrical armature 11.

Figure 7:
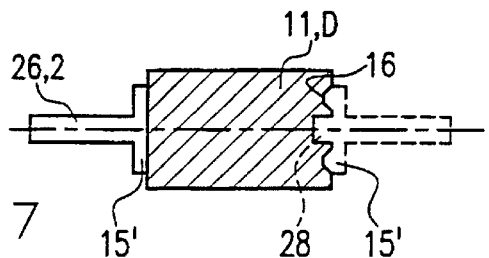

Each armature shaft 26 or component 2, respectively, is provided in FIG. 7 with a hub part 15' set against or inserted in a front side 16 of armature 11. For this purpose form fitting engagement elements 28 can be provided.

Figure 8:
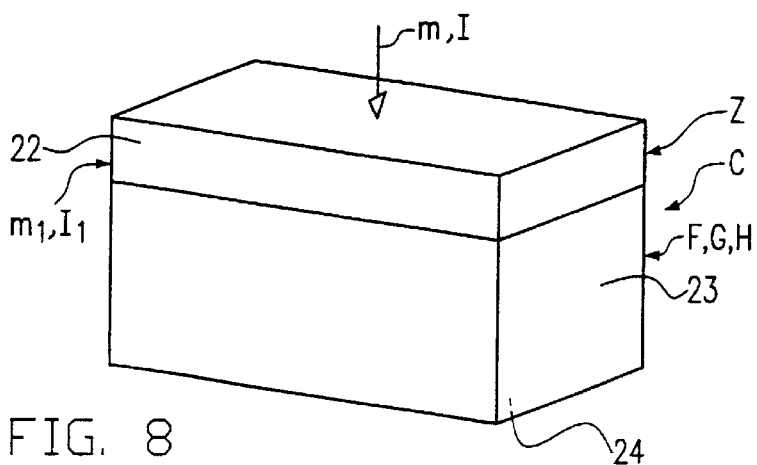
FIG. 8 is a perspective view of a detail.

FIG. 8 illustrates a stop device C having the form of a block. Additional body Z is a polyurethane block 22 bonded with its base to a polyurethane foam material cushion having the form of a block 23. Block 23 forms the movement damping device F, G, H comprising frictional damping means and/or displacement damping means F, G and a return component H, analogous to the diagram of FIGS. 9 to 12. A surface 24 of block 23 can directly abut stop 21 or can be bonded thereto.

In the cross-sectional view of FIG. 5 it can be seen that stop element 29 is a pin penetrating component 2 (or the shaft of the armature). Both ends of said pin are coacting respectively with a stop device C provided in the housing, such that an operational stroke of more than 90° can be achieved for component 2. Stop devices C are received in pockets defining stops 21 in housing parts. Stop devices C optionally can be clamped or bonded in place. In order to achieve an even larger operational stroke than 90° stop element 21 instead could protrude by just one of its ends such that this sole protruding end selectively will co-operate with the stop devices C provided for both stop positions.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An actuator for a rotatable or linearly movable component which stops at least at one defined stop position, said actuator comprising a drive element in driving connection with said component, a stop device disposed at said stop position, said stop device including an additional body having substantially the mass or moment of inertia of said drive element and said component, and a return motion damping device displaceably supporting said additional body.

2. The actuator of claim 1 wherein said motion damping device includes a resilient damping device and a return spring.

3. The actuator of claim 1 wherein said additional body is constructed of a hard material and said motion damping device comprises an elastic cushion disposed in supporting engagement with said additional body.

4. The actuator of claim 3 wherein said hard material comprises one of: plastic; and metal, and said cushion comprises a soft foam material.

5. The actuator of claim 1, wherein said component stops at two stop positions spaced linearly or rotationally from one another, said actuator further including two said stop devices spaced linearly or rotationally from one another at the respective stop positions, each said stop device including a said additional body displaceably supported by a said motion damping device and said additional bodies being symmetrically disposed relative to an axis of movement of said component.

6. The actuator of claim 1 wherein said component is rotatably movable between said two stop positions and two said stop devices are rotationally spaced from one another at the respective stop positions, each said stop device including a pair of said additional bodies and a pair of said motion damping devices disposed to support the respective additional bodies, one of said additional bodies at each said stop position being disposed to engage said component when in one of said stop positions, and the other of said additional bodies at each said stop position being disposed to engage said component when in the other said stop position.

7. The actuator of claim 6 wherein the moment of inertia of each said additional body corresponds to about half of the combined moments of inertia of said drive element, said component, and at least one working member of said component.

8. The actuator of claim 1 further including one of: a) a linear electromotor coupled to said component, said drive element comprising an armature of said linear electromotor, and said additional body having a mass substantially equal to a mass of said armature and said component; and b) a rotatable electromotor coupled to said component, said drive element comprising an armature of said rotatable electromotor, and said additional body having a moment of inertia substantially equal to a moment of inertia of said armature and said component.

9. The actuator of claim 8 wherein said electromotor comprises a permanent magnet motor having a magnetically polarized armature and an exciting coil, said coil including a core disposed in surrounding relation with said armature and a plurality of partial windings associated with said core, and said additional body and said motion damping device are structurally integrated into said permanent magnet motor.

10. The actuator of claim 8 wherein said electromotor comprises a reversible permanent magnet rotatable motor which operates with a restricted stroke, and said additional body is disposed between one of: said armature and a rotary bearing associated with said component; and a pair of spaced rotary bearings respectively associated with said armature and said component.

11. The actuator of claim 9 wherein said component comprises a rotatable spindle having a hub part which engages and supports said armature at one end thereof without penetration through said armature.

12. The actuator of claim 11 wherein said spindle includes a pair of coaxially oriented spindle components disposed at and projecting outwardly from respective opposite ends of said armature, said spindles being fixed to the respective opposite ends of said armature by respective said hub parts, at least one of said hub parts comprising one of: a pot shape which engages over the respective end of said armature; and a disk configured for insertion into the respective end of said armature.

13. The actuator of claim 1 further including a permanent magnet rotatable electromotor coupled to said component, said drive element comprises an armature of said electromotor, said component comprises a rotatable spindle having a hub part which engages and supports said armature at one end thereof, said hub part is one of: pot-shaped and engaged over said one end of said armature; and disk-shaped and defining projections therein which engage within said one end of said armature, said hub part being engaged with said one end without penetration through said armature such that the maximum cross-sectional area of said armature is available for polarization.

14. A yarn brake for variably braking a running yarn, said brake comprising a component which interacts with the yarn and an actuator including a drive element for linearly or rotatably adjusting said component into at least one stop position, a stop device which defines said stop position and includes an additional body and a return motion damping device which displaceably supports said additional body, said additional body having substantially the mass or moment of inertia of said drive element and said component.

15. The yarn brake of claim 14 wherein said component is adjustable by said drive element into two stop positions respectively defined by two said stop devices arranged symmetrically with respect to an axis of movement of said component, said additional body of each said stop device being defined by a pair of additional bodies respectively displaceably supported by a pair of return motion damping devices, each said additional body of each said stop device having substantially half of the mass or half of the moment of inertia of said drive element and said component.

16. The yarn brake of claim 14 further including an electromotor, and said drive element comprises an armature of said electromotor.

17. The yarn brake of claim 16 wherein said electromotor comprises a permanent magnet motor and said armature comprises a magnetically polarized armature, said motor including an exciting coil, a core, and a plurality of partial windings associated with said core.

18. The yarn brake of claim 14 wherein said stop device is structurally integrated into said actuator.

* * * * *